(12) United States Patent
Takahashi et al.

(10) Patent No.: US 10,294,546 B2
(45) Date of Patent: *May 21, 2019

(54) METHOD FOR RECOVERING VALUABLE METAL

(75) Inventors: Jun-ichi Takahashi, Ehime (JP); Kazuhiro Mori, Ehime (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 579 days.

This patent is subject to a terminal disclaimer.

(21) Appl. No.: 14/004,101

(22) PCT Filed: Nov. 28, 2011

(86) PCT No.: PCT/JP2011/077315
§ 371 (c)(1),
(2), (4) Date: Jul. 16, 2014

(87) PCT Pub. No.: WO2013/080266
PCT Pub. Date: Jun. 6, 2013

(65) Prior Publication Data
US 2014/0318313 A1     Oct. 30, 2014

(51) Int. Cl.
*C22B 7/00* (2006.01)
*H01M 10/54* (2006.01)
(Continued)

(52) U.S. Cl.
CPC ........... *C22B 7/001* (2013.01); *C22B 4/00* (2013.01); *C22B 21/0069* (2013.01);
(Continued)

(58) Field of Classification Search
CPC ... H01M 10/54; H01M 10/0525; C22B 7/001; C22B 4/00; C22B 21/0069; Y02E 60/122; Y02P 10/214; Y02W 30/84
See application file for complete search history.

(56) References Cited

U.S. PATENT DOCUMENTS 4,657,585 A     4/1987  Yazawa et al.
5,179,997 A *   1/1993  Koul ............... B22D 11/111
                                              164/473
(Continued)

FOREIGN PATENT DOCUMENTS

EP     1589121 A1    10/2005
JP     9-291317 A    11/1997
(Continued)

OTHER PUBLICATIONS

Office Action dated Mar. 24, 2016, issued for Korean Patent Application No. 10-2016-7004260.
(Continued)

*Primary Examiner* — Jenny Wu
(74) *Attorney, Agent, or Firm* — Locke Lord LLP; James E. Armstrong, IV; Nicholas J. DiCeglie, Jr.

(57) ABSTRACT

Provided is a method for increasing the rate of recovery of valuable metals when waste batteries batteries are treated by a dry process. The valuable metal recovery method in the dry step S20 includes a melting step ST21 including melting waste batteries to form a melt, a slag separation step ST22 including separating slag from the melt, and an alloy separation step ST23 including separating an alloy of valuable metals from the melt, wherein the slag has an aluminium oxide content of 20% by weight to less than 75% by weight and an iron content of 5% by weight to 40% by weight, calculated as metallic iron, and silicon oxide and calcium oxide are added as fluxes in the melting step ST21 so that the slag can have a melting point of at least 1,500° C., preferably at most 1,650° C.

7 Claims, 2 Drawing Sheets

(51) Int. Cl.
  *C22B 4/00* (2006.01)
  *C22B 21/00* (2006.01)
  *H01M 10/0525* (2010.01)

(52) U.S. Cl.
  CPC ........ *H01M 10/54* (2013.01); *H01M 10/0525* (2013.01); *Y02P 10/212* (2015.11); *Y02P 10/214* (2015.11); *Y02W 30/84* (2015.05)

(56) References Cited

U.S. PATENT DOCUMENTS

| | | | |
|---|---|---|---|
| 7,169,203 B2 | 1/2007 | Sakamoto | |
| 7,169,206 B2 | 1/2007 | Cheret et al. | |
| 8,840,702 B2 | 9/2014 | Verscheure et al. | |
| 8,951,331 B2 | 2/2015 | Takahashi et al. | |
| 9,212,406 B2* | 12/2015 | Takahashi | C22B 1/005 |
| 2002/0194960 A1 | 12/2002 | Yasuda et al. | |
| 2005/0235775 A1 | 10/2005 | Cheret et al. | |
| 2010/0009259 A1* | 1/2010 | Ohyama | C22C 19/03 |
| | | | 429/218.2 |

FOREIGN PATENT DOCUMENTS

| | | | |
|---|---|---|---|
| JP | 9-316678 A | | 12/1997 |
| JP | 10-152730 | | 6/1998 |
| JP | 10-158751 A | | 6/1998 |
| JP | 10153730 A | * | 6/1998 |
| JP | 11-242967 A | | 9/1999 |
| JP | 2000-054039 A | | 2/2000 |
| JP | 2000-067935 A | | 3/2000 |
| JP | 2000067935 A | * | 3/2000 |
| JP | 2000-226619 A | | 8/2000 |
| JP | 2002-327215 A | | 11/2002 |
| JP | 3563897 B2 | | 9/2004 |
| JP | 2005-042189 A | | 2/2005 |
| JP | 2012-057238 A | | 3/2012 |
| KR | 20110062307 A | | 6/2011 |
| WO | WO-2011/035915 A1 | | 3/2011 |

OTHER PUBLICATIONS

Office Action Issued to KR Application No. 10-2013-7021190, dated Mar. 24. 2015.
Office Action dated Mar. 4, 2014 in Chinese Patent Appln. No. 201180067560.3.
International Search Report of PCT/JP2011/077315.
T. Muller et al., "Development of a new metallurgical process for closed-loop recycling of discarded Nickel-Metalhydride-Batteries," Proceedings of EMC 2003, p. 1-15, 2013; XP-002752871.
International Search Report issued in PCT/JP2012/053491, dated May 1, 2012.
Office Action issued in Chinese Patent Application No. CN 201280009299.6, dated May 29, 2014.
Office Action issued in U.S. Appl. No. 13/985,690, dated Jul. 14, 2015.
Extended European Search Report issued in corresponding European Patent Application No. EP 12746714.0, dated Jan. 22, 2016.

* cited by examiner

METHOD FOR RECOVERING VALUABLE METAL

CROSS-REFERENCE TO RELATED APPLICATIONS

This application is the national phase under 35 U.S.C. §371 of PCT International Application No. PCT/JP2011/077315, filed Nov. 28, 2011, the entire contents of the aforementioned application is hereby incorporated herein by reference.

TECHNICAL FIELD

The invention relates to a method for efficiently recovering valuable metals from waste batteries, such as lithium-ion batteries.

BACKGROUND ART

Processes for recycling used or in-process defective batteries (hereinafter referred to as "waste batteries"), such as waste lithium-ion batteries, and recovering their valuable metals are broadly divided into dry and wet processes.

A dry process includes melting crushed waste batteries, separating valuable metals, which are to be recovered, from other less valuable metals and materials by harnessing the difference in oxygen affinity between them, and recovering the valuable metals. Specifically, such a dry process includes oxidizing less valuable elements, such as iron, as much as possible to form slag and suppressing the oxidation of valuable materials, such as cobalt, as much as possible to recover the valuable materials in the form of an alloy.

For example, Patent Document 1 discloses adding a $SiO_2$/CaO-based flux to waste batteries and recovering, from the mixture, valuable metals such as nickel and cobalt in the form of an alloy using a high-temperature heating furnace, wherein the resulting slag has a composition containing at least 20% iron, calculated as metallic iron, and at most 20% of each of nickel and cobalt, and having an $SiO_2$ to CaO ratio of at least 1. It discloses an example where the melting temperature is 1,450° C.

Patent Document 1: U.S. Patent Application, Publication No. 7169206

DISCLOSURE OF THE INVENTION

Problems to be Solved by the Invention

Foliated aluminium is used in the cathodes of waste batteries, such as lithium-ion batteries. Metallic aluminium, which tends to be oxidized very easily, is converted into an oxide, alumina ($Al_2O_3$), when subjected to a melting process. The alumina, which is distributed in the slag, is known to increase the melting point and the viscosity of slag. In this case, a problem occurs in which if the melting temperature is low, the slag will not melt or will have higher viscosity, so that an alloy containing valuable metals to be recovered will be poorly separated from the slag and the recovery rate will be reduced. On the other hand, in view of operational efficiency, the melting temperature is preferably as low as possible.

Therefore, when a dry process is used to separate slag and alloy from each other, it is desired that the slag should be controlled to have a lower melting point during the separation. Unfortunately, no study has been made of what component or what melting point is preferable for slag and suitable for practical production in a multi-component system, such as a waste battery treatment system, where various oxides such as oxides of iron and aluminium are incorporated into slag. Notably, Patent Document 1 does not disclose that the amount of alumina or iron should be taken into account when the melting temperature is determined.

The invention has been made to solve the above problems, and an object of the invention is to provide a method for efficiently recovering valuable metals, which can reduce the viscosity of slag to make a lower-temperature process possible and also ensure reliable separation of slag and alloy, when waste batteries, such as lithium-ion batteries, are treated by a dry process.

Means for Solving the Problems

The inventors have drawn up the invention based on the finding that when slag has a composition containing a specific amount of alumina, not only the addition of a $SiO_2$/CaO-based flux but also the co-presence of iron oxide are effective in further lowering the melting point of the whole of slag. More specifically, the invention provides the following.

(1) A method for recovering a valuable metal from a waste battery containing aluminium and iron, which includes a melting step including melting the waste battery to form a melt; a slag separation step including separating slag from the melt; and an alloy separation step including separating an alloy of a valuable metal from the melt, wherein silicon dioxide and calcium oxide are added as fluxes in the melting step, the slag has an aluminium oxide content of 20% by weight to 75% by weight and an iron content of 5% by weight to 40% by weight, calculated as metallic iron, and the melting step is performed at at least 1,500° C.

(2) The valuable metal recovery method according to item (1), wherein the melting step is performed at 1,650° C. at most.

(3) The valuable metal recovery method according to item (1) or (2), wherein the slag has a silicon dioxide to calcium oxide weight ratio in the range of 0.5 to 2.

(4) The valuable metal recovery method according to any one of items (1) to (3), wherein the melting step is performed in an electric furnace.

(5) The valuable metal recovery method according to any one of items (1) to (4), wherein the waste battery is a lithium-ion battery.

Effects of the Invention

When waste batteries, such as lithium-ion batteries, are treated by a dry process, the invention makes it possible to conduct a lower-temperature process by reducing the viscosity of slag and also makes it possible to efficiently recover valuable metals through reliable separation of slag and alloy.

EXPLANATION OF REFERENCE NUMERALS

ST10 Waste battery pretreatment step
S20 Dry step
ST21 Melting step
ST22 Slag separation
ST23 Alloy separation
ST24 Exhaust gas treatment ST25 Dephosphorylation step
ST26 Alloy shot-forming step
S30 Wet step
ST31 Dissolution step
ST32 Element separation step

PREFERRED MODE FOR CARRYING OUT
THE INVENTION

Figure 1:
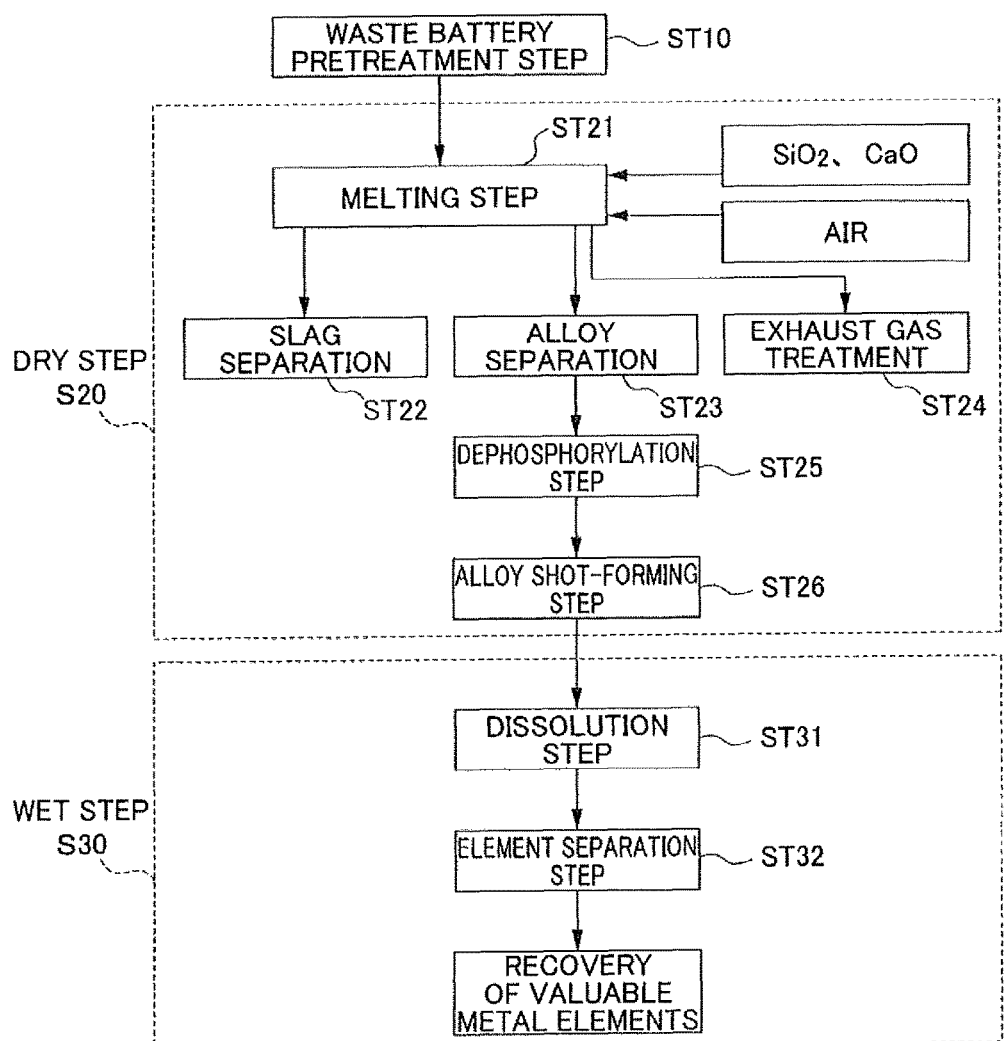
FIG. 1 is a flow chart showing an example of the invention, specifically, a method for recovering valuable metals from waste batteries.

Hereinafter, an embodiment of the invention will be described with reference to the drawings. FIG. 1 is a flow chart showing an example of a method for recovering valuable metals from waste batteries. First, the whole process of the valuable metal recovery method will be described, and then the slag composition characteristic of the invention and means for obtaining it will be described. Although this embodiment will be described for a case where the waste batteries are lithium-ion batteries, the invention is applicable to any waste batteries containing aluminium and iron, and is not restricted to this embodiment.

Whole Process

As shown in FIG. 1, this valuable metal recovery method includes a waste battery pretreatment step ST10, a dry step S20, and a wet step S30. Thus, the valuable metal recovery method according to this embodiment is a total process including obtaining an alloy in the dry step S20 and then separating and recovering valuable metal elements using the wet step S30. As used herein, the term "waste battery" is intended to include not only a used battery but also others such as in-process defect batteries. We also do not intend to exclude adding metal, resin, or any other material apart from waste batteries, as needed, as long as the object to be processed contains a waste battery. In such a case, metal, resin, or any other material is encompassed by the term "waste battery" in the invention.

Waste Battery Pretreatment Step ST10

The waste battery pretreatment step ST10 is performed to prevent waste batteries from exploding. Waste batteries are closed systems and contain an electrolytic solution or the like inside them. Thus, subjecting them to a dry melting process as they are involves a risk of explosion and is dangerous. Therefore, gas-venting holes need to be formed in some way.

The waste battery pretreatment step ST10 may be performed using any specific method. For example, holes may be mechanically formed in waste batteries using a needle-shaped cutting edge. In the invention, it is not necessary to separate or process individual parts because a melting step is performed in the later dry process.

Dry Step S20

The dry step S20 includes performing a melting step ST21 including melting the pre-treated waste batteries, which are obtained in the waste battery pretreatment step ST10, at a predetermined temperature to form a melt. The melting step ST21 can be performed in a conventionally known electric furnace or the like.

In this step, an oxidizing agent such as air is blown in to control the degree of oxidation and to increase the recovery of nickel, cobalt, and copper. For example, foliated aluminium is used in the cathode materials of lithium-ion batteries. Carbon is also used in the anode materials of lithium-ion batteries. Batteries also have outer shells made of iron or aluminium, and plastics are used in the outer packages of battery pack. These materials are basically reducing agents and thus oxidized when melted, so that the total reaction to produce gas and slag will be an oxidation reaction. Therefore, it is necessary to introduce oxygen into the system. Because of this, air is introduced in the melting step ST21.

Although the oxidizing agent is not restricted, pure oxygen, oxygen-rich gas, air, or any other oxygen-containing gas is preferably used because it is easy to handle. In the melting step ST21, the gas is directly supplied into the electric furnace. Dust, exhaust gas, and other exhaust products in the melting step ST21 are processed to be harmless in a conventionally known exhaust gas treatment ST24.

Additionally, in the melting step ST21, $SiO_2$ and CaO or other materials are added as fluxes to lower the melting point of the slag to be separated in the slag separation ST22 described below. This is a feature of the invention and will be described in detail below.

The melting step ST21 produces an alloy of valuable metals, such as nickel, cobalt, and copper, and also produces slag, which is an oxide of iron, aluminium, and the like. Both products, which have different specific gravities, are recovered in slag separation ST22 and alloy separation ST23, respectively.

After alloy separation ST23 is performed, the resulting alloy is further subjected to a dephosphorylation step ST25. In lithium-ion batteries, ethylene carbonate, diethyl carbonate, or other organic solvents are used, and $LiPF_6$ (lithium hexafluorophosphate) or other electrolytes are used. The phosphorus in $LiPF_6$ tends to be relatively easily oxidized, but also tends to have a relatively high affinity for iron group elements such as iron, cobalt, and nickel. Phosphorus in the alloy is difficult to remove by the wet step, which is a later step for recovering each element in the form of metal from the alloy obtained in the dry process, and phosphorus is also accumulated as an impurity in the treatment system, which makes it difficult to continue the process. Thus, phosphorus is removed in the dephosphorylation step ST25.

More specifically, lime or other materials capable of reacting to produce CaO are added, and oxygen-containing gas such as air is blown in so that phosphorus in the alloy can be oxidized and absorbed into the CaO.

When the waste batteries are lithium-ion batteries, the alloy obtained in this manner contains, as main components, cobalt or nickel derived from the cathode materials, lithium derived from electrolytes, and copper derived from the anode materials, etc.

Alloy Shot-forming Step S26

In this embodiment, the alloy is cooled and obtained in the form of grains (also referred to as "shot-shaped alloy" or simply "shots") at the end of the dry step S20. This makes it possible to perform a dissolution step ST31 in a short period of time in the later wet step S30.

As described below, when the dry step is performed as a pretreatment in a wide sense, an alloy with fewer impurities can be obtained, and the amount of the material to be introduced into and treated in the wet step can be significantly reduced, so that a combination of the dry step and the wet step can work effectively. However, the wet step is a complicated process and basically unsuitable for high-throughput procedures. Thus, to use the wet step in combination with the dry step, the processing time of the wet step needs to be short, and in particular, the dissolution step ST31 needs to be performed in a short period of time. This problem can be solved by forming the alloy into grains so that the dissolution time can be reduced.

In this step, the grain preferably has an average surface area in the range of 1 $mm^2$ to 300 $mm^2$ and an average weight in the range of 0.4 mg to 2.2 g. If the surface area or the weight is less than the lower limit of the range, a problem may occur in which the particles are too small and thus difficult to handle and a reaction occurs too rapidly so that it will be difficult to dissolve the particles at a time due to too much heat generation, which is not preferred. If the surface area or the weight is more than the upper limit of the range, the rate of dissolution in the later wet step can undesirably decrease. The alloy can be made in the form of shots or formed into grains using a conventionally known method of pouring the molten metal into running water to rapidly cool it.

Wet Step S30

In a process of recovering valuable metals from waste batteries, the alloy recovered as described in Patent Document 1 is not valuable, and thus valuable metal elements must be recovered. When waste batteries are pretreated by the dry step so that an alloy of only valuable metals is obtained as described above, the later wet step can be simplified. In this case, the throughput of the wet step can be reduced to about ¼ to ⅓ (weight ratio) of the amount of the input waste batteries. This also makes the use of the wet step in combination advantageous.

Using the dry step as a pretreatment in a wide sense as described above makes it possible to obtain an alloy with fewer impurities and to significantly reduce the throughput. Thus, the invention makes possible a combination of the dry step and the wet step on an industrial scale.

The wet step is not restricted and may be performed using a conventionally known method. An example of the wet step is as follows. When the waste batteries are lithium-ion batteries and specifically when an alloy of cobalt, nickel, copper, and iron is produced, the alloy is subjected to dissolution with acid (the dissolution step ST31), and then an element separation step ST32 is performed, in which deironization, separation and recovery of copper, nickel/cobalt separation, recovery of nickel, and recovery of cobalt are conducted in this order so that valuable metal elements are successfully recovered.

Throughput

In a conventional total process including a combination of a dry step and a wet step, oxidation in the dry step is performed when waste batteries are in a molten state. To control the degree of oxidation properly in the oxidation process, the melting step in the dry step of the conventional process must be a batch process, so that a new step must be performed from the beginning after the oxidation of all waste batteries, which are processed at the same time in a melting furnace, is completed. The valuable metal recovery method of the invention enables a higher throughput than conventional techniques because in the method of the invention, waste batteries having previously undergone oxidation in the pre-oxidation step can be continuously introduced into the melting furnace so that they can be continuously processed in the dry step. The invention is suitable for use in cases where the throughput is at least 1 t per day, preferably at least 10 t per day.

The waste batteries may be of any type. Preferred examples of the object to be processed according the invention are lithium-ion batteries, from which rare metals such as cobalt and nickel can be recovered, and whose applications expand to include automobile batteries and others, so that large-scale recovery processes will be necessary for them.

Addition for slag formation in the melting step ST21

Next, the formation of slag, which is a feature of the invention, in the melting step ST21 will be described. When waste batteries containing aluminium, lithium, iron, and manganese are processed, manganese becomes a main component of the slag in the process of melting the pretreated waste batteries placed in the furnace.

The oxidation of the main elements constituting the melt depends on the difference in affinity for oxygen, which generally follows the order: aluminium>lithium>carbon>manganese>phosphorus>iron>cobalt>nickel>copper. In other words, aluminium is the most vulnerable to oxidation, while copper is the most resistant to oxidation. Therefore, if the slag contains aluminium vulnerable to oxidation, aluminium oxide (alumina) will be formed as high-melting-point and high-viscosity slag.

The alumina itself has a melting point of around 2,000° C. The presence of such a component alone is not preferred because it can increase the energy cost, the rate of melting-induced damage to refractory materials, or the like, so that the operating cost may significantly increase. In particular, if the melting point exceeds 1,650° C., operation using a common electric furnace may be difficult to realize, and the parallel use of a plasma treatment as described in Patent Document 1 may also be necessary, in this way the durability of refractory materials decreases and the thermocouple for measuring the internal temperature of the furnace may also be damaged. Thus, also in order to perform the melting step ST21 in a conventionally known electric furnace, the slag has a melting point of 1,500° C. or higher, preferably 1,650° C. or lower. In this range, the melting step ST21 can be performed at a temperature between 1,500° C. and 1,650° C., and thus a conventionally known electric furnace can be used, which will increase productivity and enable the alloy and the slag to be separated from each other sufficiently, so that the rate of recovery of valuable metals in the alloy also increases.

In the invention, the melting step ST21 includes adding $SiO_2$ and CaO to lower the melting point of the slag (see FIG. 1). This enables the slag to have a lower melting point and thus to have lower viscosity. $SiO_2$ (silicon dioxide) and CaO (lime) are added. The ratio of the addition of them is preferably such that the weight ratio of silicon dioxide to calcium oxide in the slag is in the range of 0.5 to 2, more preferably in the range of 0.8 to 1.4. If the weight ratio is less than 0.5, the slag may have an undesirably high melting point. If the weight ratio is more than 2, the viscosity of the slag may be so high as to make it difficult to separate the alloy from the slag, which is not preferred.

In the invention, the amounts of alumina and iron in the slag are also important. Specifically, the slag has an alumina content of 20% by weight to 75% by weight, preferably 25% by weight to 40% by weight, and an iron content of 5% by weight to 40% by weight, calculated as metallic iron. When the slag also contains iron, not only the amount of alumina can be relatively reduced, but also iron ions can function as cations to break the alumina network in the slag, so that the iron can assist the improvement of the fluidization of the slag and reduce the melting point of the slag. As a result, the separation performance of the alloy can be increased, and thus the valuable metal recovery rate can be increased. As described above, the reduction in the melting point of the slag has been comprehensively studied taking into account not only the addition of a flux but also the amounts of aluminium and iron expected in waste battery treatment. Thus, a novel feature of the invention is based on the finding of a low-viscosity region of the slag composition which is practically available for actual operation.

First of all, if the alumina content is less than 20% by weight, the problem of the high melting point of the slag will hardly occur. The slag with an alumina content of 20% by weight has a melting point of about 1,500° C. If the alumina content exceeds 75% by weight, it will be difficult to control the melting point of the slag in the range of 1,500° C. to 1,650° C. even by controlling the flux and iron. The slag with an alumina content of 75% by weight has a melting point of about 1,650° C. On the other hand, if the iron content, calculated as metallic iron, is less than 5% by weight, the melting point of the slag will be insufficiently lowered, so that it will be difficult to control the melting point of the slag in the range of 1,500° C. to 1,650° C. If the iron content exceeds 75% by weight, iron must be supplied from an additional iron source other than the waste batteries, which is not preferred.

Thus, the slag obtained in the slag separation step ST22 has a melting point of 1,500° C. or higher, preferably 1,650° C. or lower. When the melting step ST21 is performed at 1,500° C. or higher, preferably at 1,650° C. or lower, the viscosity of the slag can be sufficiently lowered, so that the alloy can be easily separated and the rate of recovery in the alloy separation step ST23 can be increased.

EXAMPLES

Hereinafter, the invention will be more specifically described with reference to the examples below, which however are not intended to limit the invention.

Figure 2:
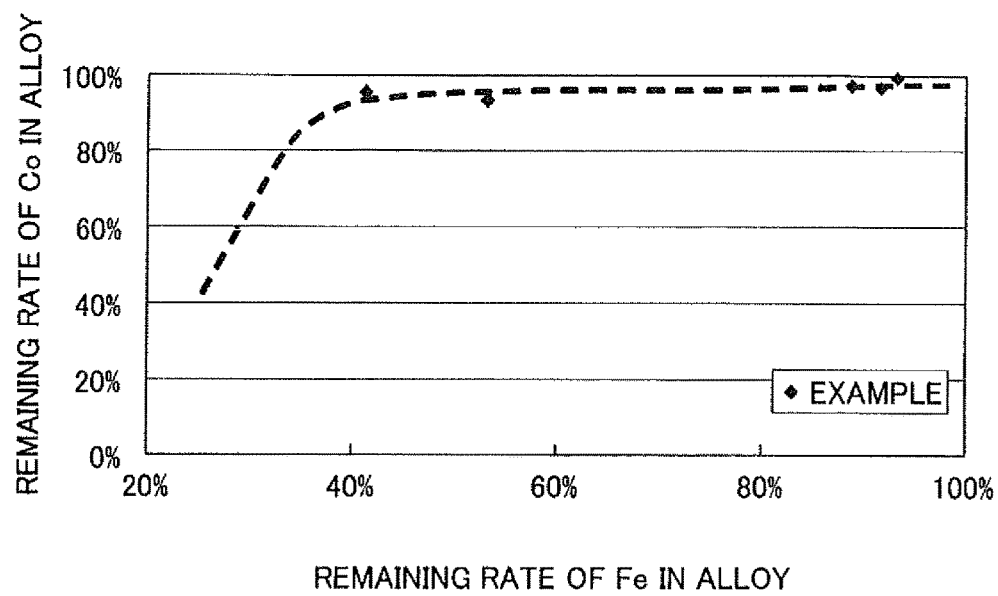
FIG. 2 is a graph showing the distribution ratios of metallic iron and metallic cobalt in an alloy in examples.

In an alumina crucible placed in an electric furnace with a nitrogen atmosphere, about 23 g of a waste lithium-ion battery and 7.3 g of a flux mixture with the $SiO_2/CaO$ ratio shown in Table 1 were held at temperatures ranging from 1,505° C. to 1,540° C. for 30 minutes. After holding the temperature in this range, a predetermined amount of oxygen was blown through an alumina tube to oxidize the sample. After the oxidation, the sample was held for 30 minutes in the furnace and cooled. After the cooling, the resulting slag and alloy were separated, recovered, and each subjected to analysis using the ICP method. For each of the slag and the alloy, the distribution ratios of metallic iron and metallic cobalt in the alloy and the distribution ratios of metallic iron and alumina in the slag were determined from their weights and the iron and cobalt analysis values. Table 1 shows the results. FIG. 2 shows the distribution ratios of metallic iron and metallic cobalt in the alloy.

TABLE 1

| | Element name | Rate of distribution in alloy | | | | | |
|---|---|---|---|---|---|---|---|
| Example | Fe | 32% | 41% | 53% | 89% | 92% | 93% |
| | Co | 73% | 96% | 94% | 97% | 97% | 99% |

TABLE 1-continued

| Element name | Concentration (wt %) in slag | | | | | |
|---|---|---|---|---|---|---|
| Fe | 32.2 | 20.2 | 17.7 | 5.9 | 5.6 | 5.2 |
| Al2O3 | 37.5 | 37.3 | 27.6 | 22.1 | 23.6 | 20.2 |
| SiO2/CaOratio | 1 | 1 | 1 | 2 | 1 | 0.5 |

Table 1 and FIG. 2 show that when the amounts of aluminium oxide and iron in the slag each fall within the range according to the invention, the viscosity of the slag can be reduced, and the metal and the slag can be well separated, so that the alloy and the slag can be successfully separated and recovered using a melting temperature of 1,500° C. to 1,650° C. FIG. 2 also shows that in this case, when the distribution ratio of iron in the alloy, namely, the ratio of the weight of metallic iron in the alloy to the total weight of iron (calculated as metallic iron) was at least 32%, the metallic cobalt recovery rate reached at least 73%, and when the ratio of the weight of metallic iron was at least 35%, preferably at least 40%, the metallic cobalt recovery rate reached at least 90%.

The invention claimed is:

1. A method for recovering a valuable metal from a waste battery containing aluminum and iron, comprising:
   a melting step comprising melting the waste battery and introducing an oxygen-containing gas to obtain a melt;
   a slag separation step comprising separating slag from the melt; and
   an alloy separation step comprising separating an alloy of a valuable metal from the melt, wherein the slag has an aluminium oxide content 25% by weight to less than 75% by weight and an iron content of 5% by weight to 40% by weight, calculated as metallic iron, and silicon oxide and calcium oxide are added as fluxes in the melting step so that the slag has a melting point of at least 1,500° C. to at most 1,650° C.

2. The valuable metal recovery method according to claim 1, wherein the slag has a weight ratio of silicon dioxide to calcium oxide in the range of 0.5 to 2.

3. The valuable metal recovery method according to claim 1, wherein the melting step is performed in an electric furnace.

4. The valuable metal recovery method according to claim 1, wherein the waste battery is a lithium-ion battery.

5. The valuable metal recovery method according to claim 2, wherein the melting step is performed in an electric furnace.

6. The valuable metal recovery method according to claim 2, wherein the waste battery is a lithium-ion battery.

7. The valuable metal recovery method according to claim 3, wherein the waste battery is a lithium-ion battery.

* * * * *